US007828991B2

(12) United States Patent
Reese et al.

(10) Patent No.: US 7,828,991 B2
(45) Date of Patent: *Nov. 9, 2010

(54) POLYETHER POLYOLS BASED ON CASHEW NUTSHELL LIQUID AND FLEXIBLE FOAMS

(75) Inventors: Jack R. Reese, Hurricane, WV (US); Micah N. Moore, Red House, WV (US); Don S. Wardius, Pittsburgh, PA (US); Stanley L. Hager, Cross Lanes, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 605 days.

This patent is subject to a terminal disclaimer.

(21) Appl. No.: 11/636,282

(22) Filed: Dec. 8, 2006

(65) Prior Publication Data

US 2008/0139685 A1  Jun. 12, 2008

(51) Int. Cl.
*C08G 18/28* (2006.01)
(52) U.S. Cl. ............... 252/182.25; 252/182.27; 568/629; 568/630; 568/648; 568/780
(58) Field of Classification Search ............ 252/182.25, 252/182.27; 568/629, 630, 648, 780
See application file for complete search history.

(56) References Cited

U.S. PATENT DOCUMENTS

| | | | |
|---|---|---|---|
| 1,725,791 A | 8/1929 | Harvey | |
| 2,317,585 A | 4/1943 | Caplan | 260/46 |
| 2,470,808 A | 5/1949 | De Groote et at | 252/340 |
| 2,758,986 A | 8/1956 | Mecum | 260/46 |
| 2,906,717 A | 9/1959 | Sekmakas | |
| 4,233,194 A | 11/1980 | Eschwey et al. | 260/22 A |
| 6,051,623 A | 4/2000 | Stielau | 521/170 |
| 7,393,465 B2 * | 7/2008 | Niesten et al. | 252/182.25 |
| 2005/0192423 A1 | 9/2005 | Niesten et al. | 528/49 |
| 2006/0004115 A1 | 1/2006 | Ittara et al. | 521/155 |

FOREIGN PATENT DOCUMENTS

| | | |
|---|---|---|
| CA | 1334700 | 3/1995 |
| DE | 100 04 427 A1 | 10/2001 |
| EP | 0648791 A1 | 4/1995 |
| JP | 48-29530 | 4/1973 |
| WO | 92/21741 | 12/1992 |
| WO | 2006/003668 A1 | 1/2006 |

OTHER PUBLICATIONS

Journal of the American Oil Chemists' Society, vol. 56, Jun. 1979, pp. 616-619, A. Strocchi et al, Cardanol in Germ and Seed Oils Extracted from Cashew Nuts Obtained by the Oltremare Process.
Journal of Organic Chemistry, vol. 15, (month unavailable) 1950, p. 707-714, Patrick T. Izzo et al, "Chew But Shell Liquid. The Higher Olefinic Components of Cardanol".
4th International Plastics Exhibition & Conference, Popular Plastics and Packaging, Plastindia Exhibition Special Issue, (month unavailable) 2000, p. 79-90, C.K.S. Pillai, "Polymeric materials from renewable resources: High value polymers from Cashewnut Shell Liquid".
Industrial & Engineering Chemistry Research (month unavailable) 2005, 44(13), p. 4504-4512, Kattimuttathu I. Suresh et al, "Synthesis, Structure, and Propertied of Novel Polyols from Cardanol and Developed Polyurethanes".

* cited by examiner

*Primary Examiner*—John Cooney
(74) *Attorney, Agent, or Firm*—N. Denise Brown; Noland J. Cheung

(57) ABSTRACT

This invention relates to novel polyether polyols which are prepared by alkoxylation of renewable resource materials, and particularly cashew nutshell liquid (CNSL), and to a process for the preparation of these novel polyether polyols. This invention also relates to flexible polyurethane foams prepared from these long chain polyether polyols, and to a process for the production of these flexible polyurethane foams.

14 Claims, No Drawings

POLYETHER POLYOLS BASED ON CASHEW NUTSHELL LIQUID AND FLEXIBLE FOAMS

BACKGROUND OF THE INVENTION

This invention relates to polyether polyols prepared by alkoxylation of cashew nutshell liquid (CNSL), a renewable resource material, to the process for the preparation of these polyether polyols, to flexible foams produced from these long chain polyether polyols, and to a process for the production of these foams.

Polyurethane foams have found extensive use in a multitude of industrial and consumer applications. This popularity is due to the wide ranging mechanical properties of polyurethane combined with its ability to be relatively easily manufactured. Automobiles, for example, contain numerous polyurethane components, such as seats, dashboards and other cabin interior parts. Polyurethane foams have traditionally been categorized as being flexible, semi-rigid or rigid; with flexible foams generally being softer, less dense, more pliable and more subject to structural rebound subsequent to loading than are rigid foams. Most flexible polyurethanes foams in commerce are produced by either a free-rise (slabstock) or molded process.

The production of polyurethane foams is well known to those skilled in the art. Polyurethanes are formed from the reaction of NCO groups with hydroxyl groups. The most common method of polyurethane production is via the reaction of a polyol and a polyisocyanate which forms the backbone urethane group. A blowing agent is also included in the formulation along with a surface active agent to generate the characteristic cellular structure of the polyurethane foam. Most flexible polyurethane foam formulations contain water as an isocyanate reactive component to chemically form carbon dioxide as a blowing agent and an amine moiety which reacts further with the polyisocyanate to form urea backbone groups within the polymer. These urethane-urea polymers are also included under the broad definition of polyurethanes. Cross-linking agents, blowing agents, flame retardants, catalysts and other additives may also be included in the polyurethane formulation as needed.

Polyols used in the production of polyurethanes are typically petrochemical in origin, being generally derived from propylene oxide, ethylene oxide and various starters such as propylene glycol, glycerin, sucrose and sorbitol. Polyester polyols and polyether polyols are the most common polyols used in polyurethane production. For flexible foams, polyester or polyether polyols with molecular weights of from about 2,000 to 10,000 are generally used, whereas for rigid and semirigid foams, shorter chain polyols with molecular weights of from about 400 to 2,000 are typically used. Polyester and polyether polyols can be selected to allow the engineering of a particular polyurethane foam having desired final toughness, durability, density, flexibility, compression ratios and modulus and hardness qualities. Generally, higher molecular weight polyols and lower functionality polyols tend to produce more flexible foams than do lower molecular weight polyols and higher functionality polyols.

Petroleum-derived components such as polyester and polyether polyols pose several disadvantages. Use of such polyester or polyether polyols contributes to the depletion of petroleum-derived oil, which is a non-renewable resource. Also, the production of a polyol requires the investment of a great deal of energy because the oil needed to make the polyol must be drilled, extracted and transported to a refinery where it is refined and processed to purified hydrocarbons that are subsequently converted to alkoxides and finally to the finished polyols. As the consuming public becomes increasingly aware of the environmental impact of this production chain, consumer demand for "greener" products will continue to grow. To help reduce the depletion of petroleum-derived oil whilst satisfying this increasing consumer demand, it would be advantageous to partially or wholly replace petroleum-derived polyester or polyether polyols used in the production of polyurethane foams with renewable and more environmentally responsible components.

Attempts have been made by workers in the art to accomplish the replacement of petroleum-derived polyols with components derived from renewable resources. Plastics and foams made using fatty acid triglycerides derived from vegetable oils, including castor oil, sunflower oil, canola oil, linseed oil, cottonseed oil, corn oil, poppy seed oil, peanut oil and soybean oil and derivative of these, have been developed. With increased interest in renewable, versatile, and environmentally-friendly resources, cashew nutshell liquid (CNSL) is also gaining attention as a potential ingredient for plastics manufacture.

Various investigations and uses of cashew nutshell liquid and/or cashew nutshell oil are described in, for example, U.S. Pat. Nos. 1,725,791, 2,317,585, 2,470,808, 2,758,986, and 4,233,194; were reported by A. Strocchi and G. Lercker in the article "Cardanol in Germ and Seed Oils Extracted from Cashew Nuts Obtained by the Oltremare Process" in *Journal of the American Oil Chemists' Society*, Vol. 56, June 1979, pp. 616-619; and by Patrick T. Izzo and Charles R. Dawson in the article "Cashew Nut Shell Liquid. VII. The Higher Olefinic Components of Cardanol" in *Journal of Organic Chemistry*, Vol. 15, 1950, pp. 707-714.

More recently, cashew nutshell liquid has been investigated as a potential monomer source for producing polymeric materials. See, for example, the paper by C. K. S. Pillai titled "Polymeric Materials from Renewable Resources: High Value Polymers from Cashewnut Shell Liquid" presented at the 4th International Plastics Exhibition & Conference, Popular Plastics and Packaging, Plastindia Exhibition Special Issue, 2000, pp. 79-90.

Various compositions can be produced from cardanol as described in JP48029530 and WO 92/21741. JP48029530 discloses reacting an aldehyde condensate of CNSL or cardanol or aldehyde cocondensate with ethylene oxide or propylene oxide to form an oxyetherified substance which can be reacted with a diisocyanate to form a quick-dry coating composition. WO 92/21741 describes aqueous cleaning compositions comprising mixtures of cardanol ethoxylation products. U.S. Pat. No. 6,229,054 describes derivatives of cardanol formed by hydroxyalkylation with cyclic organic carbonates.

A new class of polyols from cardanol which are suitable for the production of polyurethanes are described by Kattimattahu I. Suresh and Vadi S. Kishanprasad in the article "Synthesis, Structure, and Properties of Novel Polyols from Cardanol and Developed Polyurethanes" in *Industrial & Engineering Chemistry Research* (2005), 44(13), pp. 4504-4512. Also, see WO 2006/003668A1 and U.S. Published patent application U.S. 2006/004115 A1, which are believed to be equivalents. These published patents describe these polyols and the production of polyurethanes from such polyols.

Other polymers based on the oil of CNSO (cashew nutshell oil) are disclosed in U.S. Pat. No. 6,051,623. These products are formed from CNSO and diisocyanates or polyisocyanates. The CNSO is a mixture of a biphenol and a fatty acid, the NCO group of the isocyanates can react with the COOH of the fatty acid, the OH of the phenyl radicals or the double bonds of the chains. The resultant products are rigid foamed plastic materials.

DE 10004427 described polyurethanes produced from polyisocyanates and CNSL in which the double bonds are at least partially saturated by the reaction with sulfur or peroxides under heating. These CNSL products may be mixed with other polyols and/or soybean oil and reacted with polyisocyanates to form hard plastic products.

Hydrophobic polyols of low viscosity which are prepared by reacting a mixture having an OH number of 180 to 300, a viscosity at 23° C. of 5000 to 20,000 mPa·s and an OH functionality of 2.8 to 4.5 are disclosed in U.S. Published patent application 2005/0192423 A1. This mixture of cardanol-depleted cashew-nutshell liquid (CNSL) is reacted with alkylene oxides to form hydrophobic polyols which can be reacted with polyisocyanates to form polyurethane systems that are suitable as coatings, adhesives, sealants or molding compounds.

It has now been discovered that polyether polyols derived from cashew nutshell liquid can be produced which are suitable for the production of flexible polyurethane foams. Unlike polyether polyols derived from vegetable oil based polyols, the CNSL polyols can be alkoxylated in the presence of strongly alkaline catalysts without substantially degrading the initiating polyol. This facilitates the formation of poly(oxyethylene) capped polyether polyols having high primary hydroxyl content, which are desirable for flexible foam processing; especially molded foam.

SUMMARY OF THE INVENTION

This invention relates renewable resource based polyether polyols which have an OH number of from 20 to 130, and a functionality of about 2.8 to about 4.5. These polyether polyols comprise the reaction product of:
(a) a mixture having an OH number of from about 180 to about 300, an average functionality of about 2.8 to about 4.5, which comprises
  (i) from 5 to 25% by weight of cardanol (i.e. 3-pentadecadienylphenol),
  (ii) from 5 to 15% by weight of cardol (i.e. 3-pentadecadienylrecorcinol),
  (iii) from 1 to 5% by weight of 6-methylcardol (i.e. 2-methyl-3-pentadecadienylrecorcinol),
  and
  (iv) from 60 to 80% by weight of phenolic OH-functional organic compounds having a number average molecular weight of greater than 700,
  with the sum of the %'s by weight of (i), (ii), (iii) and (iv) totaling 100% by weight of the mixture (a);

with
(b) one or more alkylene oxides, optionally, in the presence of
(c) one or more catalysts, with the weight ratio of the amounts of (a) and (b) ranging from 50:50 to 5:95.

The process for preparing these polyether polyols comprises (1) reacting (a) the mixture having an OH number of from about 180 to about 300, an average functionality of about 2.8 to about 4.5 and which comprises component (i) through (iv) as described above, with (b) one or more alkylene oxides, optionally, in the presence of (c) one or more catalysts, with the weight ratio of components (a) and (b) ranging from 50:50 to 5:95.

The present invention also relates to flexible foams produced from long chain polyether polyols in which the polyols are alkoxylation products of cashew nutshell liquid, and to a process for the production of these flexible foams.

These flexible foams comprise the reaction product of:

(A) at least one polyisocyanate component;

with (B) an isocyanate-reactive component comprising
  (1) a polyether polyol having an OH number of from about 20 to about 200 and a functionality of about 2.8 to about 4.5 and prepared by alkoxylating a mixture having an OH number of from about 180 to about 300 and an average OH functionality of from about 2.8 to about 4.5, and comprising
    (i) from 5 to 25% by weight of cardanol (i.e. 3-pentadecadienylphenol),
    (ii) from 5 to 15% by weight of cardol (i.e. 3-pentadecadienylrecorcinol),
    (iii) from 1 to 5% by weight of 6-methylcardol (i.e. 2-methyl-3-pentadecadienylrecorcinol),
    and
    (iv) from 60 to 80% by weight of phenolic OH-functional organic compounds having a number average molecular weight of >700,
    with the sum of the %'s by weight of (i), (ii), (iii) and (iv) totaling 100% by weight of the mixture;

in the presence of (C) at least one blowing agent;

(D) at least one surfactant;

and (E) at least one catalyst at an isocyanate index of from about 70 to about 130.

The process of producing these flexible foams comprises (I) reacting (A) at least one polyisocyanate component with (B) an isocyanate-reactive component comprising the polyether polyol as described above, in the presence of (C) at least one blowing agent, (D) at least one surfactant and (E) at least one catalyst, at an isocyanate index of about 70 to about 130.

DETAILED DESCRIPTION OF THE INVENTION

As used herein, the term "pbw" refers to parts by weight.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

OH=(56.1×1000)/Eq. Wt.

wherein:
OH: represents the hydroxyl number of the polyol,
Eq. Wt. represents the average equivalent weight of the polyol.

As used herein, the functionality of the polyol represents the average nominal functionality of the polyol, i.e. the average number of hydroxyl groups per molecule of starter used to produce the polyol.

As used herein, the term "renewable resource material" is defined as a starting material that is not derived from petroleum but as a starting material derived from a plant including the fruits, nuts and/or seeds of plants. These plant derived materials are environmentally friendly and biologically based materials. Thus, these starting materials are also frequently called "bio-based" materials or "natural oil" materials. In particular, the renewable resource material of choice in the present invention is cashew nutshell liquid (CNSL).

The polyols prepared from these various non-petroleum sources as identified above are frequently referred to as "renewable resource based polyols", "bio-based polyols", "biopolyols" and/or "natural oil polyols". While some renewable resource materials, such as castor oil, contain naturally occurring hydroxyl groups, most natural oils must be converted to the hydroxyl containing polyols by chemical processes such as hydroxylation, epoxidation, ozonolysis, hydroformylation/hydrogenation or other suitable processes.

As used herein, the term molecular weight refers to the number average molecular weight unless indicated otherwise.

The novel renewable resource based polyether polyols of the present invention are characterized by an OH number of from 20 to 130, and a functionality of about 2.8 to about 4.5.

These novel polyether polyols of the invention typically have an OH number of at least 20 and more preferably of at least 25. These polyether polyols also typically have an OH number of less than or equal to 130, preferably less than or equal to 100, and more preferably of less than or equal to 80. The polyether polyols may have an OH number ranging between any combination of these upper and lower values, inclusive, e.g. from 20 to 130, preferably from 20 to 100, and more preferably from 25 to 80.

These novel polyether polyols of the invention typically have a functionality of at least about 2.8 and more preferably of at least about 3.0. These polyether polyols also typically have a functionality of less than or equal to about 4.5, preferably less than or equal to about 4.0, and more preferably of less than or equal to about 3.5. The polyether polyols may have a functionality ranging between any combination of these upper and lower values, inclusive, e.g. from about 2.8 to about 4.5, preferably 2.8 to 4.0. and more preferably 3.0 to 3.5.

In addition, it is preferred that the novel polyether polyols herein have a viscosity of at least about 250 mPa·s, more preferably at least about 300 mPa·s and most preferably at least about 350 mPa·s at 25° C. It is also preferred that these polyether polyols have a viscosity of less than or equal to about 3000 mPa·s, more preferably less than or equal to about 2500 mPa·s, most preferably less than or equal to about 1500 mPa·s, and most particularly preferably less than or equal to about 1000 mPa·s at 25° C. These polyether polyols may have a viscosity ranging between any combination of these upper and lower values, inclusive, e.g. from about 250 mPa·s to less than or equal to about 3000 mPa·s at 25° C., from about 250 mPa·s to less than or equal to about 2500 mPa·s at 25° C., from about 300 mPa·s to less than or equal to about 1500 mPa·s at 25° C., and from about 350 mPa·s to less than or equal to about 1000 mPa·s at 25° C.

These polyether polyols comprise the reaction product of (a) a mixture having an OH number of from about 180 to about 300, an average functionality of about 2.8 to about 4.5, and which comprise (i) from 5 to 25% by weight of cardanol (i.e. 3-pentadecadienylphenol), (ii) from 5 to 15% by weight of cardol (i.e. 3-pentadecadienylrecorcinol), (iii) from 1 to 5% by weight of 6-methylcardol (i.e. 2-methyl-3-pentadecadienyl-recorcinol), and (iv) from 60 to 80% by weight of phenolic OH-functional organic compounds having a number average molecular weight of >700, with the sum of the %'s by weight of (i), (ii), (iii) and (iv) totaling 100% by weight of the mixture; with (b) one or more alkylene oxides, optionally, in the presence of (c) one or more catalysts. In accordance with the present invention, the relative amounts of components (a) and (b) are such that the weight ratio of (a) to (b) ranges from 50:50 to 5:95, preferably from 40:60 to 5:95, more preferably from 30:70 to 10:90, and most preferably from about 25:75 to about 15:85.

Suitable mixtures to be used as component (a) in the polyether polyols include those having an OH number of from about 180 to about 300, preferably from about 200 to 270, and an average functionality of about 2.8 to about 4.5, preferably from about 2.8 to about 4.0. These mixtures comprise (i) from 5 to 25% (preferably 5 to 20%) by weight of cardanol (i.e. 3-pentadecadienylphenol), (ii) from 5 to 15% (preferably 5 to 10%) by weight of cardol (i.e. 3-pentadecadienyl-recorcinol), (iii) from 1 to 5% by weight of 6-methylcardol (i.e. 2-methyl-3-pentadecadienylrecorcinol), and (iv) from 60 to 80% by weight of phenolic OH-functional organic compounds having a number average molecular weight ($M_n$) of >700, with the sum of the %'s by weight of (i), (ii), (iii) and (iv) totaling 100% by weight of the mixture.

Industrially, cardanol (i.e. 3-pentadecadienylphenol) is obtained from the shells of cashew nut kernels and/or from the CNSL obtained therein. The CNSL is extracted from the layer between the nut and shell of the cashew nut. This interlayer contains predominantly anacardic acid (i.e. 2-carboxyl-3-pentadecadienylphenol) and related acids having different double bond contents, and cardol (i.e. m-pentadecadienylresorcinol). The liquid is extracted from the interlayer by heating, in the course of which the acids are decarboxylated. The products thus obtained comprise cardanol (i.e. 3-pentadecadienylphenol), cardol (i.e. 3-pentadecadienylrecorcinol) and related compounds having different numbers of double bonds. The side chains of these which are saturated or cis-unsaturated, may undergo additional reaction, by polymerization, to form higher molecular mass compounds (i.e. polymers).

Cardanol is isolated from the CNSL by distillation. The residue which remains contains not only higher molecular mass organic compounds but typically also from 5 to 25% by weight of cardanol residues and from 5 to 15% by weight of cardol (i.e. 3-pentadecadienyl-recorcinol) and from 1 to 5% by weight of 6-methylcardol (i.e. 2-methyl-3-pentadecadienylrecorcinol).

In accordance with the present invention, it is preferred that (a) the mixture is prepared cardanol from the cashew nutshell liquid (CNSL) and contains the stated amounts of cardanol, cardol, and 6-methylcardol and typically, from 60 to 80% (preferably from 65 to 75%) by weight of possibly phenolic OH-functional organic compounds with a number-average molecular weight of $M_n$>700 g/mol, with the sum of the amounts totaling 100% by weight of the mixture.

In accordance with the present invention, it is preferred that mixture (a) have an OH number of from 200 to 270. The viscosity of this mixture is from about 5000 to about 20,000 mPa·s at 25° C. The average functionality of this mixture ranges from about 3 to about 4.

Mixtures such as those suitable to be used as component (a) in accordance with the present invention from cardanol preparation are obtainable from Cardolite Corporation, in Newark, N.J. under the tradename CARDOLITE NX-4670. These are characterized by an OH number of about 210 to about 260, and a viscosity of about 5000 to 20,000 mPa·s at 25° C.

Alkoxylation of the mixture (a) occurs by the polyaddition of the compounds of component (b) onto groups of mixture (a) that contain active hydrogen atoms.

Suitable alkylene oxides to be used in accordance with the present invention include, for example, ethylene oxide, propylene oxide, butylenes oxide and mixtures thereof. Ethylene oxide and propylene oxide are preferred alkylene oxides herein. When two or more alkylene oxides are employed as component (b), they may undergo blockwise or random polyaddition. Further details are provided in "Ullmanns Encyclopedia of Industrial Chemistry", Volume A21, 1992, p. 670f.

The polyaddition reaction can be carried out in the absence or presence of a suitable catalyst, i.e. component (c). Suitable catalysts include, for examples, those known per se to the skilled artisan which are suitable for catalyzing the alkoxylation reaction of various initiators. These include, for example, alkali metal hydroxides and double-metal cyanide (DMC) catalysts.

The renewable resource material of the present invention can be alkoxylated in an alkaline environment (i.e. in the presence of an alkaline catalyst) enabling the production of EO end-capped polyether polyols. In accordance with the present invention, it is preferred that (a) the polyether polyols herein are capped with from 10 to 30% by weight of EO, based on the total weight of the polyether polyol.

The ability to EO cap a renewable resource material using an alkali metal hydroxide catalyst is surprising. Most renewable resource materials, including the most common ones such as soybean oil and/or castor oil, can not typically be alkoxylated in the presence of an alkaline catalyst without significant degradation of the ester linkages present in these renewable resource materials. By comparison, cashew nutshell liquid (CNSL) or the residue mixture used as the starter herein for the polyther polyols (a), contains phenolic OH groups and no ester linkages.

In addition, for non-EO end capped polyether polyols prepared from cashew nutshell liquid (CNSL), double-metal cyanide (DMC) catalysts are also suitable for catalyzing the alkoxylation reaction with the CNSL.

The typical process for the polyaddition of alkylene oxides to compounds containing active hydrogen groups is known to one of ordinary skill in the art. Typically, the mixture (a) is introduced initially and component (b) the alkylene oxides are added with polyaddition. The process is generally conducted at temperatures ranging from 20 to 200° C., preferably from 40 to 180° C., and more preferably from 50 to 150° C. The reaction can be conducted at overall pressures of from 0.001 to 20 bar, The polyaddition can be carried out either continuously or discontinuously, such as, for example, in a batch or semi-batch process.

The resultant polyether polyols are characterized by an OH number of from 20 to 130, preferably of from 20 to 100 and more preferably from 25 to 80. These polyether polyols have a functionality of about 2.8 to about 4.5, preferably 2.8 to 4.0 and more preferably 3.0 to 3.5. In addition, the novel polyether polyols herein preferably have a viscosity of about 250 to less than or equal to about 3000 mPa·s at 25° C.

Suitable polyisocyanates to be used as component (A) in accordance with the present invention include, for example, monomeric diisocyanates, NCO prepolymers, and liquid polyisocyanates. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cycloaliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl)methane, 2,4'-dicyclohexylmethane diisocyanate, 1,3- and 1,4-bis(isocyanatomethyl) cyclohexane, bis(4-isocyanato-3-methyl-cyclohexyl)methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,2'-, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) obtained by phosgenating aniline/formaldehyde condensates may also be used.

It is preferred that the polyisocyanates of the present invention are aromatic polyisocyanates. Some examples of suitable aromatic poly-isocyanates are 1,3- and/or 1,4-phenylene diisocyanate, 2,4- and/or 2,6-toluene diisocyanate (TDI), 2,2'-, 2,4'- and/or 4,4'-diphenylmethane diisocyanate (MDI), 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) (i.e. pMDI) obtained by phosgenating aniline/formaldehyde condensates may also be used. Most preferred polyisocyanates comprise a blend of the 2,4- and 2,6-isomers of toluene diisocyanate; an isomeric mixture of diphenylmethane diisocyanate comprising the 2,2'-, 2,4'- and/or 4,4'-isomers; and a polymethylene poly(phenylisocyanate) comprising a monomer content of from 40% to 100% and a content of higher homologues of MDI of from 60% to 0%.

The isocyanate-reactive component (B) of the present invention comprises (1) a polyether polyol having an OH number of from about 20 to about 200, and a functionality of from about 2.8 to about 4.5. These polyether polyols typically have OH numbers of at least about 20, preferably at least about 25 and more preferably at least about 30. The polyether polyols also typically have OH number of less than or equal to about 200, preferably less than or equal to about 100 and more preferably less than or equal to about 75. These polyether polyols may also have an OH number ranging between any combination of these upper and lower values, inclusive, e.g. from 20 to 200, preferably from 25 to 100 and more preferably from 30 to 75.

These polyether polyols (B)(1) are prepared by alkoxylating a mixture which is characterized by an OH number of from about 180 to about 300 and an average OH functionality of from about 2.8 to about 4.5. This mixture preferably has an OH number of from about 180 to about 300, and an average OH functionality of from about 2.8 to about 4.5. More specifically, this mixture comprises (i) from 5 to 25% (preferably 5 to 20%) by weight of cardanol, i.e. 3-pentadecadienylphenol; (ii) from 5 to 15% (preferably 5 to 10%) by weight of cardol, i.e. 3-pentadecadienyl-recorcinol; (iii) from 1 to 5% by weight of 6-methylcardol, i.e. 2-methyl-3-pentadecadienylrecorcinol; and (iv) from 60 to 80% by weight of phenolic OH-functional organic compounds having a number average molecular weight of greater than 700; with the sum of the %'s by weight of (i), (ii), (iii) and (iv) totaling 100% by weight of the mixture.

This mixture which is used as a starter and is alkoxylated to form (1) the polyether polyols used as (B) the isocyanate-reactive component in accordance with the present invention is a residue mixture which is formed by the distillation of cashew nutshell liquid (CNSL). This distillation residue mixture is commercially available by the tradename CARDO-LITE NX-4670 from Cardolite Corporation in Newark, N.J. Thus, the starter mixture used to prepare (a) the polyether polyols of the present invention is a renewable resource material.

The mixture is alkoxylated with one or more alkylene oxides to form (1) the polyether polyols of (B) the isocyanate-reactive component required herein. Preferred alkylene oxides are propylene oxide and/or ethylene oxide. In accordance with the present invention, the ratio (in % by weight) of propylene oxide to ethylene oxide used to alkoxylate the mixture described above typically comprises from 100:0 (PO:EO) to 0:100 (PO:EO). Preferably the total weight percent of EO in the polyol is less than 50% and more preferably less than 30%. Alkoxylation of the above mixture may occur in the presence of a suitable catalyst such as, for example, one or more alkaline catalysts. Suitable alkaline catalysts include KOH, NaOH, etc. and other conventional alkaline catalysts typically used in the preparation of polyether polyols.

In addition to (1) the polyether polyol described above, the isocyanate-reactive component (B) of the present invention may optionally comprise one or more polyols not derived from CNSL such as the standard polyether and polyester polyols used in flexible polyurethane foam production, polymer polyols, crosslinking agents, chain extenders, etc.

As indicated, non-CNSL derived polyols may be used along with those prepared from the CNSL. These may include, but are not limited to, polyethers, polyesters, polyacetals, polycarbonates, polyesterethers, polyester carbonates, polythioethers, polyamides, polyesteramides, polysiloxanes, polybutadienes and polyacetones. Other renewable resource based polyols, not derived from CNSL, may also be used to increase the overall renewable resource content of the foam. Suitable non-CNSL polyols for flexible foams should have an OH number of from about 20 to about 200, and a functionality of from about 2 to about 6.

The optional non-CNSL based polyether polyols may be made via the standard base catalyzed alkoxylation of initiators that is well known in the art or alternatively by alkoxylation using double metal cyanide (DMC) catalysts. Preferably, double metal cyanide complex catalysts such as those disclosed in U.S. Pat. Nos. 5,158,922 and 5,470,813 are used. The preferred polyether polyols are those produced by alkoxylation of initiators with propylene oxide and ethylene oxide. Polyols end-capped with ethylene oxide are particularly preferred for molded foam processing.

As those skilled in the art are aware, polymer polyols (PMPOs) are dispersions of polymer solids in a polyol. These may be used along with the CNSL based polyol to improve foam processing or to enhance the load bearing capacity of the foam or to improve other foam properties. Any polymer (or dispersion) polyol known in the art may be included in the polyol component of the present invention. Those polymer polyols preferred for use in the present invention include the "SAN" polymer polyols as well as the "PHD" dispersion polyols and the "PIPA" dispersion polyols. Although historically polymer polyols referred to just the SAN type, as used herein polymer polyols is meant to refer to all three types of polymer/dispersion polyols.

Isocyanate reactive cross-linkers and/or extenders ("modifiers") are known by those skilled in the art to be added to polyurethane formulations to improve processing or to affect the physical properties of the resultant articles. Such modifiers typically are glycols or glycol amines having a molecular weight of less than 350 and having functionalities between 2 and 8.

Suitable blowing agents to be used as component (C) in accordance with the present invention include but are not limited to compounds such as, for example, water, carbon dioxide, fluorocarbons, chlorofluorocarbons, hydrochlorofluorocarbons, perfluorocarbons, and low boiling hydrocarbons. Some examples of suitable hydrochlorofluorocarbons include compounds such as 1,1-dichloro-1-fluoroethane (HCFC-141b), 1-chloro-1,1-difluoroethane (HCFC-142b), and chlorodifluoro-methane (HCFC-22); of suitable hydrofluorocarbons include compounds such as 1,1,1,3,3-pentafluoropropane (HFC-245fa), 1,1,1,2-tetrafluoro-ethane (HFC-134a), 1,1,1,3,3,3-hexafluoropropane (HFC-236fa), 1,1,2,3,3,3-hexafluoropropane (HFC-236ea), and 1,1,1,4,4,4-hexafluorobutane (HFC-356mffm); of suitable perfluorinated hydrocarbons include compounds such as perfluoropentane or perfluorohexane; and of suitable hydrocarbons include compounds such as various isomers of butane, pentane, cyclopentane, hexane, or mixtures of thereof. Water and carbon dioxide are more preferred blowing agents, with water being most preferred.

In accordance with the present invention, the quantity of blowing agent used is typically that which will produce foams having a density as described herein. As one of ordinary skill in the art would know and understand, it is necessary to use a larger quantity of blowing agent to form a lower density foam while a higher density foam requires a smaller quantity of blowing agent. The quantity of blowing used should typically produce foams which have a density of about 0.5 pcf or more, preferably about 1.0 pcf or more, more preferably about 1.2 or more, and most preferably about 1.5 pcf or more. The quantity of blowing agent used should also typically produce foams which have a density of less than or equal to 20 pcf, preferably less than or equal to 10 pcf, and more preferably less or equal to 8 pcf and most preferably less or equal to 5 pcf. The quantity of blowing agent used in the present invention should produce a foam having a density ranging between any combination of these upper and lower values, inclusive, e.g. from at least about 0.5 to about 20 pcf, preferably from about 1.0 to about 10 pcf, more preferably from about 1.2 to about 8 pcf, and most preferably from about 1.5 to about 5 pcf.

Suitable surfactants to be used as component (D) in accordance with the present invention include, for example, any of the known surfactants which are suitable for production of polyurethane foams. These include, for example, but are not limited to silicone-type surfactants, fluorine-type surfactants, organic surfactants, etc. Organo-silicone copolymer surfactants are widely used in the production of polyurethane foams with polysiloxane-polyoxyalkylene copolymers representing a preferred class. Some examples of suitable surfactants include those compounds commercially available from Degussa-Goldschmidt, General Electric, Air Products, etc. such as those sold as NIAX Silicones L-620, L-5614, L-627, L-6164, L-3858, L-629, L-635, U-2000, etc., and TEGOSTAB Silicones B-8002, B-2370, B-8229, B-8715F, B-8715LF, B-8719LF, etc., and DABCO DC5043, DC5160, DC5169, DC5164, etc.

In accordance with the invention, one or more catalysts (E) are used. Any suitable urethane catalyst may be used, including the known tertiary amine compounds and organometallic compounds. Examples of suitable tertiary amine catalysts include triethylenediamine, N-methyl-morpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, bis[2-dimethylaminoethyl]ether, diazabicyclooctane, N-ethylmorpholine, diethylethanolamine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include organomercury, organolead, organoferric and organotin catalysts, with organotin catalysts being preferred. Suitable organotin catalysts include preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. Metal salts such as stannous chloride can also function as catalysts for the urethane reaction. Such catalysts are typically used in an amount, which measurably increases the rate of reaction of the polyisocyanate. Typical amounts are about 0.01 to about 4.0 pbw, and preferably about 0.03 to about 2.0 pbw of catalyst (i.e. the total of all catalysts) per 100 parts by weight of (B) the isocyanate-reactive component.

The flexible foams of the present invention are prepared by mixing together one or more isocyanates with the isocyanate reactive component, blowing agents, catalysts, surfactants, and optionally various other additives known to those in the art. After mixing, the foaming mixture may be deposited into an open container or continuously onto a moving conveyor and be allowed to rise freely (free-rise process). The open container or conveyor may be enclosed in a chamber to provide for foam rise under vacuum or with increased pressure (Variable Pressure Foaming Process). The foaming mixture may also be deposited into a mold that is then closed thus forcing the foam to take on the shape of the mold (molded process).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples of the present application.

Isocyanate A: toluene diisocyanate having an NCO group content of about 48%, and comprising 80% by weight of the 2,4-isomer and 20% by weight of the 2,6-isomer.

Isocyanate B: a polymeric polymethylene polyisocyanate having an NCO group content of about 32.5% by weight, a functionality of about 2.3, and having a total monomer content of about 76% which comprises about 52% of the 4,4'-isomer, about 22% of the 2,4'-isomer and about 2% of the 2,2'-isomer, and about 24% by weight of higher molecular weight homologues of the MDI series.

Cardolite NX-4670: a mixture comprising (i) 10-25% by weight of cardanol (i.e. 3-pentadecadienylphenol), (ii) 5-15% by weight of cardol (i.e. 3-pentadeca-dienyl-recorcinol), (iii) 1-3% by weight of 6-methylcardol (i.e. 2-methyl-3-pentadecadienyl-recorcinol), and (iv) 65-75% by weight of phenolic OH-functional organic compounds having a number average molecular weight of greater than 700, with the sum of (i), (ii), (iii) and (iv) totaling 100% of the mixture.

Polyether Polyol 1: a polyether polyol having a functionality of about 3, an OH number of about 41 and 15% EO cap, prepared by alkoxylating the mixture of cashew nutshell liquid with propylene oxide and end capping with ~15% by weight ethylene oxide.

Polyether Polyol 1 was prepared by charging 2668 grams of Cardolite NX-4670 into a 20 liter reactor. The reactor was inerted with nitrogen and heated to 105° C. At a steady temperature of 105° C., 12665 grams of propylene oxide were added and allowed to cookout. At a steady temperature of 115° C., 2700 grams of ethylene oxide were added and allowed to cookout. The product was removed from the reactor and mixed with water and sulfuric acid at 80° C. for 60 minutes. The water was distilled and the product filtered to remove the salts. The final product was characterized by an OH number of about 40.8, a viscosity of 873 mPa·s at 25° C. and a pH of 7.8.

Polyether Polyol 2: a polyether polyol having a functionality of about 3, an OH number of about 60 and 15% EO cap, prepared by alkoxylating the mixture of cashew nutshell liquid with propylene oxide and end capping with ~15% by weight ethylene oxide.

Polyether Polyol 2 was prepared by charging 4183 grams of Cardolite NX-4670 into a 20 liter reactor. The reactor was inerted with nitrogen and heated to 105° C. At a steady temperature of 105° C., 11216 grams of propylene oxide were added and allowed to cookout. At a steady temperature of 115° C., 2700 grams of ethylene oxide were added and allowed to cookout. The product was removed from the reactor and mixed with water and sulfuric acid at 80° C. for 60 minutes. The water was distilled and the product filtered to remove the salts. The final product was characterized by an OH number of about 59.5, a viscosity of 732 mPa·s at 25° C. and a pH of 7.9.

Polyether Polyol 3: a polyether polyol having a functionality of about 3, an OH number of about 71 and 8.5% EO by weight, prepared by alkoxylating the mixture of cashew nutshell liquid with 87.7% propylene oxide and 12.3% ethylene oxide.

Polyether Polyol 3 was prepared by charging 4408 grams of Cardolite NX-4670 and 50.3 grams of 90% KOH into a 20 liter reactor. The reactor was inerted with nitrogen and heated to 105° C. At a steady temperature of 105° C., 11217 grams of propylene oxide and 1582 grams of ethylene oxide were added simultaneously and allowed to cookout. The product was removed from the reactor and mixed with water and sulfuric acid at 80° C. for 60 minutes. The water was distilled and the product filtered to remove the salts. The final product was characterized by an OH number of about 70.9, a viscosity of 620 mPa·s at 25° C. and a pH of 7.3.

Polyether Polyol 4: a glycerin and propylene glycol initiated polyether polyol having a functionality of about 2.8, an OH number of about 56 and an EO content of about 7% by weight. The polyol was produced by the DMC catalyzed copolymerization of propylene oxide and ethylene oxide.

Polyether Polyol 5: a glycerin/sorbitol initiated polyether polyol having a nominal functionality of about 3.4, an OH number of about 31.5 and prepared by alkoxylating a blend of 72% by weight of glycerin and 28% by weight of sorbitol with propylene oxide and capping with ~16% ethylene oxide by weight in the presence of a KOH catalyst.

Polyether Polyol 6: a glycerin initiated polyether polyol having a functionality of about 3, an OH number of about 28 and prepared by alkoxylating glycerin with propylene oxide and end capping with ~13% ethylene oxide by weight in the presence of a KOH catalyst.

Polyether Polyol 7: a glycerin/sorbitol initiated polyether polyol having a functionality of about 3.4, an OH number of about 31.5 and prepared by alkoxylating a blend of 72% by weight of glycerin and 28% by weight of sorbitol with propylene oxide and end capping with ~19% ethylene oxide by weight in the presence of a KOH catalyst.

Polymer Polyol 1: a polymer polyol containing about 41% by weight styrene/acrylonitrile solids dispersed in Polyether Polyol 7.

DEOA: diethanolamine.

DEOA-LF: a blend of 85% by weight diethanolamine and 15% by wt. water.

Cell Opener: a polyether polyol cell opener commercially available as Voranol polyol 4053.

Surfactant 1: a silicone surfactant, commercially available as Niax L-620.

Surfactant 2: a silicone surfactant, commercially available as Dabco DC 5043.

Surfactant 3: a silicone surfactant, commercially available as B-8715LF.

Surfactant 4: a silicone surfactant, commercially available as Tegostabi B8719LF.

Surfactant 5: a silicone surfactant, commercially available as Niax L-3100.

Antioxidant 1: a blend of a hindered phenol antioxidant, diphenylamine antioxidant and a phosphite stabilizer, commercially available as Naugard PS-35.

Catalyst 1: stannous octoate, a gel catalyst commercially available as Dabco T-9.

Catalyst 2: a tertiary amine catalyst in dipropylene glycol, commercially available as Niax C-183.

Catalyst 3: bis[2-dimethylaminoethyl]ether (70% by wt.) in dipropylene glycol (30% by wt.), a blowing catalyst commercially available as Niax A-1.

Catalyst 4: diazabicyclooctane in dipropylene glycol, commercially available as Niax A-33.

Examples 1-4

The free-rise slabstock foams in Examples 1-4 were prepared by the following procedure:

All the formulation ingredients except Catalyst 1 and Isocyanate A were added to a one-half gallon cylindrical container fitted with baffles. The contents were mixed at 2400 rpm for 60 seconds with an agitator having two turbine impellers. The mixture was then degassed for 15 seconds. Catalyst 1 was added at this time. After degassing, the contents were mixed at 2400 rpm for 15 seconds, during which period Isocyanate A was added with about 7 seconds of mixing remaining. The mixture was then poured into a 14×14×6-inch cardboard box, where it rose freely until the reaction was complete. A batch size sufficient to give a bun height of ~9 inches high was employed. The freshly prepared bun was cured for 5 minutes in an oven at 120° C. and then allowed to cure at ambient conditions for a minimum of 2 days. Observations made during foaming and cure are provided in Table 1. The buns were then trimmed to 12×12×4 inches using a band saw. These samples were then conditioned for at least 16 hours at standard temperature (~23° C.) and humidity (~50%) before testing.

Examples 5-8

The molded foams in Examples 5 to 9 were prepared by the following procedure:

All the formulation ingredients except the isocyanate were added to a one-half gallon cylindrical container fitted with baffles. The contents were mixed at 3700 rpm for 60 seconds with an agitator having two turbine impellers. The mixture was then degassed for 60 seconds. The isocyanate was added to the container and the contents were mixed for 5 seconds. The mixture was then poured into a preconditioned mold (15×15×2"), preheated to 65° C., while shaking the mixing container to ensure that the required amount was transferred to the mold. The mold was immediately clamped and sealed. The foam reaction proceeded for the prescribed demold time of 4 to 5 minutes, after which the foam was demolded. The foam was aged for seven days at room temperature prior to measuring physical and mechanical properties.

The physical or mechanical properties were measured per the procedures prescribed in ASTM D3574-05 unless noted otherwise below. Wet Compression Set (50%) was determined by measuring the height of three 2×2×1" specimens per sample, compressing to 50% of their height, holding for 22 hours in the compressed state at 50° C. and 95% relative humidity, removing the specimens from the compression fixture and allowing the specimens to recover for 30 minutes at room temperature, remeasuring the height and then determining the average percent height loss relative to the original height. Air flow was measured on 2"×2"×1" thick specimens using an AMSCOR Model 1377 Foam Porosity Instrument.

The results presented in Tables 1, 2 and 3 demonstrate that flexible foams having acceptable performance for many applications can be prepared from the CNSL derived polyol by free-rise and molded processes.

TABLE 1

Examples 1-4: Slabstock Free Rise Foams

| Component | Example 1 | Example 2 | Example 3 | Example 4 |
|---|---|---|---|---|
| Polyether Polyol 4 | 100 | | 100 | |
| Polyether Polyol 3 | | 99.50 | | |
| Polyether Polyol 2 | | | | 99.50 |
| Water | 4.20 | 4.20 | 4.20 | 4.20 |
| Surfactant 1 | 0.70 | 0.70 | 0.70 | 0.70 |
| Antioxidant 1 | | 0.50 | | 0.50 |
| Catalyst 1 | 0.16 | 0.24 | 0.28 | 0.20 |
| Catalyst 2 | 0.15 | 0.30 | 0.15 | 0.25 |
| Isocyanate A | 50.70 | 53.02 | 50.70 | 51.21 |
| Isocyanate Index | 103 | 103 | 103 | 013 |
| Characteristics: | | | | |
| Cream Time (s) | 15.00 | 15.00 | 15.00 | 9.00 |
| Rise Time (s) | 98.00 | 104.00 | 76.00 | 92.00 |
| Final Height (in) | 9.01 | 9.28 | 9.54 | 8.58 |
| Shrinkage | Nil | Nil | Nil | Nil |
| Cell Structure | Fine (A) | Fine (A) | Fine (A) | Fine (A) |
| Properties: | | | | |
| Density (lb/ft3) | 1.44 | 1.47 | 1.43 | 1.43 |
| Resilience (%) | 38 | 27 | 29 | 29 |
| Air Flow (ft3/min) | 4.95 | 4.9 | 1.43 | 1.44 |
| IFD 25% (lb/50 in2) | 22.68 | 21.91 | 29.7 | 25.07 |
| IFD 65% (lb/50 in2) | 48.38 | 46.68 | 57.35 | 54.18 |
| S.F. 65%/25% | 2.13 | 2.13 | 1.93 | 2.16 |
| Tensile Strength (psi) | 9.45 | 9.11 | 15.48 | 9.05 |
| Elongation (%) | 179 | 115 | 218 | 105 |
| Tear Strength (pli) | 2.59 | 1.24 | 3.01 | 1.87 |
| Compression Set | 24.62 | 21.06 | 21.75 | 26.47 |

TABLE 1-continued

Examples 1-4: Slabstock Free Rise Foams

|  | Example 1 | Example 2 | Example 3 | Example 4 |
|---|---|---|---|---|
| 90%, Cd |  |  |  |  |
| HACS 75%, Cd | 5.5 | 33 | 17.3 | 33.7 |
| Wet Set 50%, Ct | 8.213 | 29.15 | 28.63 | 34.04 |

TABLE 2

Molded Foams—Examples 5-7

|  | Example 5 | Example 6 | Example 7 |
|---|---|---|---|
| Component |  |  |  |
| Polyether Polyol 1 |  | 65 | 65 |
| Polyether Polyol 5 | 65 |  |  |
| Polymer Polyol 1 | 35 | 35 | 35 |
| Water | 3.25 | 3.25 | 3.25 |
| DEOA | 1.2 | 2 | 2 |
| Surfactant 2 |  |  | 1 |
| Surfactant 3 | 0.85 | 0.5 |  |
| Surfactant 4 | 0.15 | 0.5 |  |
| Cell Opener | 0.5 |  |  |
| Catalyst 4 | 0.35 | 0.35 | 0.35 |
| Catalyst 3 | 0.1 | 0.08 | 0.08 |
| Isocyanate A | 38.88 | 41.76 | 41.81 |
| Isocyanate Index | 100 | 100 | 100 |
| Properties: |  |  |  |
| Density (lb/ft$^3$) | 2.50 | 2.51 | 2.56 |
| Resilience (%) | 67 | 47 | 51 |
| Air Flow (ft$^3$/min) | 3.87 | 2.6 | 2.83 |
| IFD 25% (lb/50 in$^2$) | 33.93 | 31.46 | 31.97 |
| IFD 50% (lb/50 in$^2$) | 57.04 | 55.06 | 55.59 |
| IFD 65% (lb/50 in$^2$) | 86.64 | 86.24 | 86.54 |
| Return Val. @ 25% | 83.14 | 75.57 | 75.63 |
| S.F. 65%/25% | 2.55 | 2.74 | 2.71 |
| CFD 50% (psi) | 0.33 | 0.31 | 0.32 |
| Tensile Strength (psi) | 18.05 | 22.78 | 20.97 |
| Elongation (%) | 112.90 | 111.9 | 107.7 |
| ASTM Tear (pli) | 1.67 | 1.47 | 1.447 |
| Compression Set 50%, Cd | 10.09 | 20.8 | 20.85 |
| HA Ld Loss 50% (psi) | 0.31 | 0.33 | 0.34 |
| HACS 50%, Cd (%) | 14.65 | 32.87 | 33.33 |
| Wet Set 50%, Ct (%) | 19.48 | 36.48 | 36.23 |
| Hysteresis % (%) | 25.50 | 35.42 | 33.67 |

TABLE 3

Molded Foams—Examples 8-9

|  | Example 8 | Example 9 |
|---|---|---|
| Component |  |  |
| Polyether Polyol 1 |  | 80 |
| Polyether Polyol 6 | 80 |  |
| Polymer Polyol 1 | 20 | 20 |
| Water | 3.4 | 3.34 |
| Cell Opener | 3 |  |
| Surfactant 5 | 0/85 | 0.85 |
| DEOA-LF |  | 0.4 |
| Catalyst 4 | 0.32 | 0.32 |
| Catalyst 3 | 0.08 | 0.08 |
| Isocyanate B | 52.84 | 56.07 |
| Isocyanate Index | 95 | 95 |
| Properties: |  |  |
| Density (lb/ft$^3$) | 3.28 | 3.23 |
| Resilience (%) | 53 | 34 |
| Air Flow (ft$^3$/min) | 1.69 | 1.24 |
| IFD 25% (lb/50 in$^2$) | 62.49 | 59.04 |
| IFD 50% (lb/50 in$^2$) | 106.03 | 108.9 |
| IFD 65% (lb/50 in$^2$) | 165.67 | 178.2 |
| Return Val. @ 25% | 78.21 | 65.52 |
| S.F. 65%/25% | 2.65 | 3.02 |
| CFD 50% (psi) | 0/60 | 0.64 |
| Tensile Strength (psi) | 21.53 | 29.33 |
| Elongation (%) | 98.80 | 87.1 |
| ASTM Tear (pli) | 1.34 | 1.6 |
| Compression Set 50%, Cd | 16.78 | 45.93 |
| HA Ld Loss 50% (psi) | 0.56 | 0.61 |
| HACS 50%, Cd (%) | 15.91 | 44.31 |
| Wet Set 50%, Ct (%) | 10.60 | 24.58 |
| Hysteresis % (%) | 33.51 | 46.74 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing renewable resource based polyether polyols having an OH number of from 20 to 130 and a functionality of about 2.8 to about 4.5, which comprises
   (1) reacting
      (a) a mixture having an OH number of from about 180 to about 300, an average functionality of about 2.8 to about 4.5, which comprises
         (i) from 5 to 25% by weight of 3-pentadecadienylphenol,
         (ii) from 5 to 15% by weight of 3-pentadecadienylrecorcinol,
         (iii) from 1 to 5% by weight of 2-methyl-3-pentadecadienylrecorcinol, and
         (iv) from 60 to 80% by weight of phenolic OH-functional organic compounds having a number average molecular weight of greater than 700,
         with the sum of the %'s by weight of (i), (ii), (iii) and (iv) totaling 100% by weight of the mixture (a);
   with
      (b) one or more alkylene oxides,
      optionally, in the presence of
      (c) one or more catalysts,
         with the weight ratio of components (a) to (b) ranges from 50:50 to 5:95.

2. The process of claim 1, wherein the renewable resource based polyether polyols have an OH number of from 20 to 100 and a functionality of about 2.8 to about 4.0.

3. The process of claim 1, wherein the renewable resource based polyether polyols have an OH number of from 25 to 80 and a functionality of about 3.0 to about 3.5.

4. The process of claim 1, wherein (a) said mixture has an OH number of from about 200 to about 270 and an average functionality of about 2.8 to 4.0.

5. The process of claim 1, wherein the weight ratio of the components (a) to (b) ranges from 40:60 to 5:95.

6. The process of claim 1, in which (c) said catalyst is selected from the group consisting of alkali metal hydroxides and double-metal cyanide (DMC) catalysts.

7. The process of claim 1, wherein the renewable resource based polyether polyols are capped with from 10 to 30% by weight of ethylene oxide.

8. A renewable resource based polyether polyol having an OH number of from 20 to 130 and a functionality of about 2.8 to about 4.5 which comprises the reaction product of:
(a) a mixture having an OH number of from about 180 to about 300, an average functionality of about 2.8 to about 4.5, which comprises
  (i) from 5 to 25% by weight of 3-pentadecadienylphenol,
  (ii) from 5 to 15% by weight of 3-pentadecadienylrecorcinol,
  (iii) from 1 to 5% by weight of 2-methyl-3-pentadecadienylrecorcinol,
  and
  (iv) from 60 to 80% by weight of phenolic OH-functional organic compounds having a number average molecular weight of greater than 700,
  with the sum of the %'s by weight of (i), (ii), (iii) and (iv) totaling 100% by weight of the mixture (a);
with
(b) one or more alkylene oxides,
optionally, in the presence of
(c) one or more catalysts,
with the weight ratio of the amounts of (a) and (b) ranging from 50:50 to 5:95.

9. The renewable resource based polyether polyol of claim 8, which are characterized by an OH number of from 20 to 100 and a functionality of about 2.8 to about 4.0.

10. The renewable resource based polyether polyol of claim 8, which are characterized by an OH number of from 25 to 80 and a functionality of about 3.0 to about 3.5.

11. The renewable resource based polyether polyol of claim 8, wherein (a) said mixture has an OH number of from about 200 to about 270 and an average functionality of about 2.8 to 4.0.

12. The renewable resource based polyether polyol of claim 8, wherein the weight ratio of the components (a) to (b) ranges from 40:60 to 5:95.

13. The renewable resource based polyether polyol of claim 8, in which (c) said catalyst is selected from the group consisting of alkali metal hydroxides and double-metal cyanide (DMC) catalysts.

14. The renewable resource based polyether polyol of claim 8, wherein the renewable resource based polyether polyols are capped with from 10 to 30% by weight of ethylene oxide.

* * * * *